Patented July 1, 1941

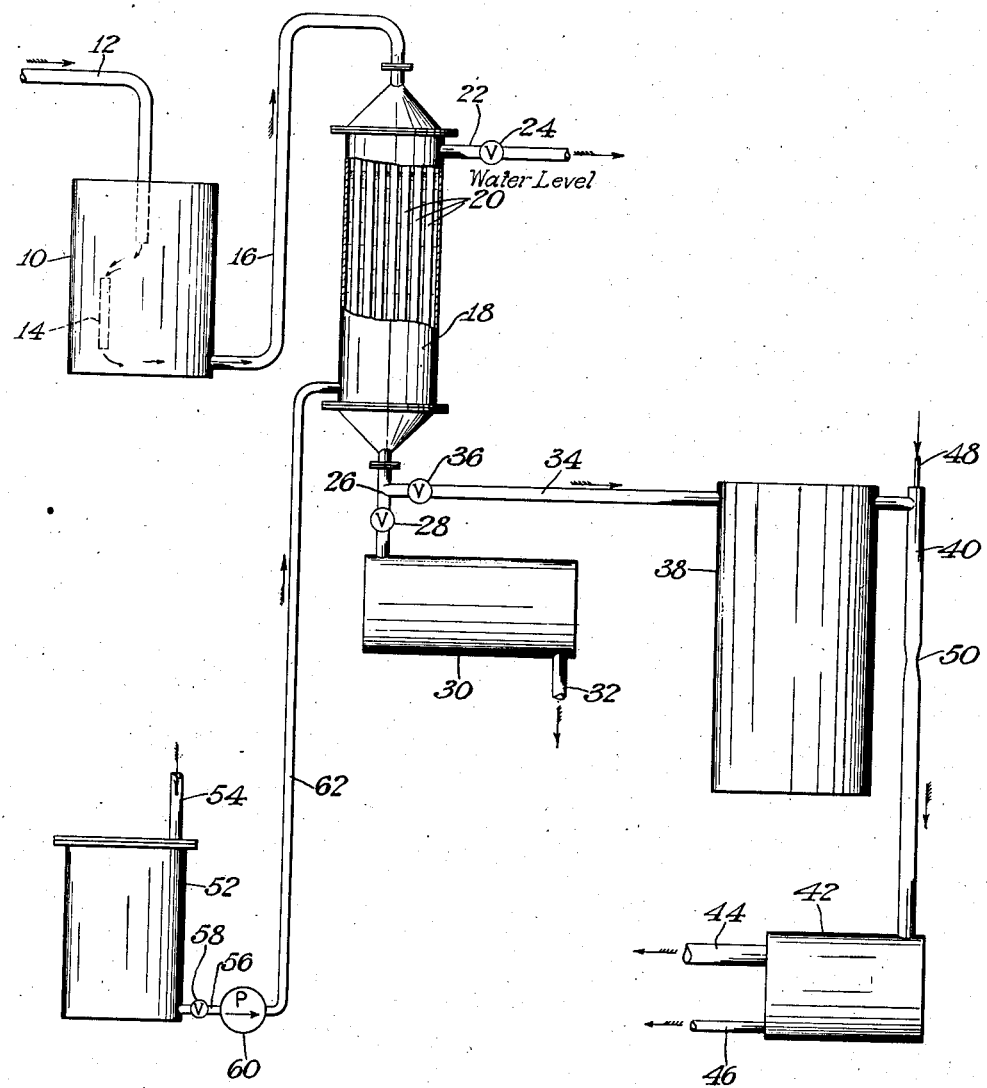

2,247,910

UNITED STATES PATENT OFFICE 2,247,910

PHTHALIC ANHYDRIDE

William Alexander Douglass, Penns Grove, and Harold La Belle Jones, Carneys Point, N. J., assignors to E. I. du Pont de Nemours & Company, Wilmington, Del., a corporation of Delaware Application May 20, 1937, Serial No. 143,670

2 Claims. (Cl. 260—342)

This invention relates to the vapor phase partial oxidation of organic compounds such as naphthalene and particularly to the recovery of phthalic anhydride from the reaction mixture that results from such operation and apparatus for such processes. More especially, the invention relates to improvements in the recovery of the products from the vapor mixture resulting from the partial oxidation of naphthalene in the vapor phase at elevated temperatures, and more particularly to the purification of the vapor mixture prior to the final condensation of the phthalic anhydride.

In the manufacture of phthalic anhydride as ordinarily practiced at the present time, hot air is mixed with the vapors of the organic compound to be oxidized and the mixture, under pressure in some cases, is passed through tubes containing a catalyst, which tubes are in a tubular converter the structure of which is well known. The organic compound is partially oxidized in such converter and the resulting gaseous vapor mixture is passed into large bins where the mixture is cooled and the phthalic anhydride deposited as a solid. In some cases, the gaseous mixture is passed through a pre-cooler where the vapor mixture is partially cooled to a temperature only slightly above the dew-point of the phthalic anhydride and without condensation of the phthalic anhydride in liquid form, and then into one or more bins where the vapor mixture is cooled and the phthalic anhydride is deposited in the bin in solid form. The resulting product is relatively impure and contains tar and other compounds which likewise condense in the bins. Also, it is usually necessary to employ a series of bins in order to obtain sufficient cooling for complete recovery of the phthalic anhydride.

The dew-point of a gaseous vapor mixture, with respect to phthalic anhydride contained therein in vapor form, is the temperature at which such product begins to precipitate from the vapor phase to the liquid or solid phase at the particular pressure and the concentration of the phthalic anhydride in the gaseous mixture. The dew-point of phthalic anhydride will vary with variation in its concentration in the mixture in a manner similar to water vapor in air, the dew-point increasing with increase in concentration of the phthalic anhydride in the mixture. Also the dew-point will vary with variation in pressure in a manner similar to water vapor in air, the dew-point decreasing as the pressure is decreased. The dew-point is also affected by the nature and amount of other substances in the gaseous mixture.

The previously proposed use of the pre-cooler has been attended with much difficulty, due to the attempt to reduce the temperature of the vapor mixture to as near the dew-point of the phthalic anhydride as possible. It was extremely difficult to properly control the temperature of the pre-cooler and there was the very grave tendency to over-cool and cause tarry products and small amounts of the phthalic anhydride to condense in the pre-cooler in solid form, thereby requiring the operation to be repeatedly interrupted for the purpose of cleaning the pre-cooler as the tarry products tend to adhere strongly to the walls of the pre-cooler. As soon as a film of such products is formed on the walls, such film causes the products to build up layer upon layer of solid products which eventually clog the pre-cooler and stop the process. These layers of solid products also constitute a fire hazard as they are highly combustible.

It is an object of the present invention to modify the processes as heretofore used, and particularly the operation of the pre-cooler to overcome the various objections to the processes heretofore followed. A further object is to recover part of the phthalic anhydride in a liquid state, together with most of the less volatile impurities, before the vapor mixture enters the condensing bins. A still further object is to recover the sensible and latent heats of the gases and liquids in a form which may readily be used. Another object is to provide a process of manufacturing and recovering phthalic anhydride in a more economical manner. Still other objects will appear hereinafter.

The above and other objects are accomplished in accordance with our invention, which comprises cooling a continuously moving gaseous mixture of the type formed by the vapor phase partial oxidation of organic compounds, such as naphthalene, under pressure to a temperature below the dew-point but above the melting point of the phthalic anhydride, in the presence of the liquid phase, so as to condense part of the gaseous phthalic anhydride and the greater proportion of the less volatile impurities, such as tar and the like, before passing the gaseous mixture to the condensing bins.

This invention may be more clearly understood from a consideration of the accompanying drawing and the following description applied, for illustration purposes only, to the manufacture of phthalic anhydride by the vapor phase partial oxidation of naphthalene.

In this drawing the figure is a view illustrating more or less diagrammatically the arrangement of the apparatus with parts broken away to more clearly show the structure.

Referring to this drawing, it may be noted that the individual pieces of apparatus shown are of conventional type which may be purchased on the market and which are well known to those skilled in the art.

A mixture of air and naphthalene is prepared in the usual manner and heated approximately to the temperature for the reaction. The air and naphthalene are usually mixed in the proportion of about 18 to about 35 parts of air to one part of naphthalene. The preheated air-naphthalene mixture enters the converter 10 through a conduit 12 under superatmospheric pressure preferably at about 15 to about 100 pounds per square inch. When the proportions of air to naphthalene approaches 18 to 1 at pressures approaching 100 pounds, the tendency toward explosions in the apparatus increases. Therefore, it is preferable to use proportions of at least 23 parts of air to 1 part of naphthalene.

The converter 10 is the usual type of tubular converter containing a plurality of tubes, one of which is indicated at 14, containing a catalyst. The tubes are surrounded by a suitable bath to maintain the catalyst at the desired reaction temperature.

The reaction mixture, containing phthalic anhydride in the vapor form and at a temperature varying from about 400° C. to about 550° C. and at a pressure of about 15 to about 100 pounds per square inch gage, passes out of the converter near the bottom and through conduit 16 to a pre-cooler 18. This pre-cooler may be of any desired construction but is here shown as of the conventional tubular type containing a multiple of tubes, one of which is indicated at 20, surrounded by a cooling fluid, preferably water, for cooling the gaseous reaction mixture to the desired temperature. When water is used, it is maintained at approximately the level indicated so as to provide a vapor space connected with an outlet conduit 22 which is provided with an automatic pressure regulating valve 24 and is preferably connected so that the steam generated may be used to preheat the air or naphthalene or otherwise in the process. The heat of the gaseous mixture is transferred to the water causing it to boil without changing the temperature of the water. The water will absorb large amounts of heat due to its latent heat of vaporization and thus cools the gaseous mixture. The boiling point of the water is varied as desired by regulating the pressure in the vapor space by the pressure regulating valve 24. Other cooling fluids, such as diphenyl, high boiling oils and the like, may be employed in place of the water, if desired, although water or a similar liquid, volatilizable at the maximum temperature desired for the cooling liquid, is preferred.

The temperature of the cooling liquid is controlled so that the gaseous mixture is cooled in the pre-cooler to a temperature below the dew-point, but above the melting point of the phthalic anhydride, so as to condense part of the phthalic anhydride in liquid form together with the greater proportion of the tar and other less volatile impurities. After condensation has started, further condensation takes place in the presence of liquid products previously condensed and flowing down the walls of the tubes, which liquid aids in condensing more material and in preventing the tarry products and the like from adhering to the tubes. These liquid products flow out through the bottom of the pre-cooler 18 through the conduit 26, into a catch tank 30, from which they may pass to any suitable container or apparatus for purifying the resulting liquid product. A valve 28 is provided in the conduit 26 to cut off the flow of liquid when desired, as for example, when it is desired to empty the tank through conduit 32, or otherwise. The remainder of the gaseous mixture passes out of the pre-cooler through conduit 34 and throttling valve 36, where the pressure on the gas is reduced to approximately atmospheric pressure, to one or more condensers 38, here shown as a conventional condensing bin. The gas expands and the phthalic anhydride deposits in solid or crystalline form in the condensers. The gases, freed of the phthalic anhydride, pass out of the condensers through conduit 40 to a tank or other receptacle 42. The remaining gases pass out to the atmosphere through conduit 44 and the liquids pass from such receptacle through conduit 46 as waste. At the top of the conduit 40 is provided a water conduit 48 which, by means of the contracted portion 50 of the conduit 40, withdraws the gaseous products from the condensers and at the same time washes such gases.

A feed water tank 52 is provided to contain a reservoir of the water. A conduit 54 is connected with a source of supply to provide make-up water; in other words, to replace water lost in the system. The water flows out of the feed water tank or reservoir through conduit 56, controlled by valve 58, to a pump 60 which pumps water continuously through conduit 62 to the pre-cooler 18 so as to maintain the water at the proper level. Temperature regulating apparatus may be provided in the cooling fluid circuit so that the fluid entering the heat exchanger or pre-cooler will be at the desired temperature.

The present invention relates primarily to the operation of the pre-cooler 18 and the condensation therein of part of the phthalic anhydride together with tarry materials and other less volatile impurities. As has been pointed out hereinbefore, the pre-cooler is so regulated that the temperature of the gaseous mixture is reduced to a temperature below the dew-point of the mixture, but above the melting point of the phthalic anhydride. Preferably, the pre-cooler is so regulated that the temperature of the gaseous mixture leaving the pre-cooler is between about 132° C. to about 160° C., phthalic anhydride melting at about 128° C. In the case where water is employed as the cooling liquid, the cooling system is maintained under a pressure of from about 9 to about 45 pounds per square inch whereby the water boils at from about 113° C. to about 135° C. This will vary in accordance with the temperature of the gases entering the pre-cooler, the proportion of phthalic anhydride in the gases, the amount of phthalic anhydride which it is desired to condense and the dew-point of the gaseous mixture. The amount of gases flowing through the pre-cooler, the dew-point of the gaseous mixture, the amount of phthalic anhydride in the gases and the pressure on the gaseous mixture will depend upon the converter and its operation, which will vary with different operators and with different converters and catalysts.

Variation in the dew-point with variation in amount of phthalic anhydride in the gaseous mixture, other conditions remaining constant, is shown in the following Table I.

TABLE I

| Percent phthalic anhydride in the gas (by volume) | Dew point, °C. at 33#/sq. in. gage |
|---|---|
| .67 | 154 |
| .604 | 151 |
| .56 | 148 |

The dew-point should generally be maintained between 132° C. and 160° C., and preferably between about 145° C. and about 155° C. In other words, the dew-point should be maintained as high as practical above the melting point of the phthalic anhydride to effect a maximum temperature differential for heat transfer and to enable the condensation of the greatest possible amount of the phthalic anhydride as a liquid in the pre-cooler. This dew-point may be varied by varying the proportion of air to naphthalene entering the converter, the pressure on the gases and the efficiency of the converter in oxidizing the naphthalene to phthalic anhydride.

When the volume of phthalic anhydride in the gaseous mixture and the pressure thereon is maintained substantially constant as is usual with processes of this type, the temperature of the cooling liquid in the pre-cooler will be varied in accordance with the amount of condensation desired. In general, the temperature of the cooling liquid will not vary with the rate of flow of gases through the pre-cooler where the pre-cooler is of a sufficient size to properly handle the greatest flow expected in the operation.

The effect of variation in amount of phthalic anhydride in the gas, variation in the temperature of the cooling liquid in the pre-cooler and in the pressure on the gaseous mixture is more clearly shown in the following Table II.

TABLE II

| Volume percent of phthalic anhydride | Cooling liquid temperature, °C. | Pressure, lb. per sq. in. | Percent phthalic anhydride condensed |
|---|---|---|---|
| .559 | 140 | 40 | 23 |
| .559 | 130 | 40 | 47 |
| .768 | 140 | 40 | 36 |
| .768 | 130 | 40 | 58 |
| .768 | 130 | 30 | 13 |

The operation of this invention and the factors governing the same will be more clearly understood from the following examples, which are given for illustrative purposes only.

*Example 1*

Naphthalene was partially oxidized to phthalic anhydride in a converter of the type disclosed. The reaction gases contained about 2 to 3% of carbon dioxide, 3 to 4% of phthalic anhydride, 14 to 16% of oxygen, 75% of nitrogen, 1.5 to 2% of water vapor and small amounts of tar, naphthalene and other substances, the proportions given being by weight. This gaseous mixture was passed through the pre-cooler under a pressure of about 30 to 50 pounds per square inch gage and at a rate of about 4,000 to 6,000 pounds per hour. It entered the pre-cooler at a temperature of about 415° C. to about 440° C. The cooling liquid in the pre-cooler was maintained at a temperature between 115° C. and 140° C. The temperature of the gaseous mixture leaving the pre-cooler was about 135° to 160° C. About 20 to about 30% by weight of the phthalic anhydride in the gaseous mixture was condensed as a liquid, together with tar and other less volatile impurities. There was little tendency for solids to crystallize out and adhere to the walls of the tubes of the pre-cooler.

*Example 2*

In this example, the gases from the converter were at a temperature of about 420° C. and under a pressure of about 33 pounds per square inch gage. Boiling water was used as the cooling medium and its temperature was regulated by an automatic pressure control valve. Make-up water was heated to the boiling water temperature by a suitable water heating system to avoid cold spots in the pre-cooler. The water level in the pre-cooler was manually controlled by throttling the feed pump. Some of the steam generated was used for preheating the air entering the mixing tank and the rest of the steam was allowed to pass out to the atmosphere. The boiling point of the water in the pre-cooler was varied by varying the pressure on the vapor space in the cooling system. The feed water temperature was maintained the same as that corresponding to the steam pressure, and the water level in the pre-cooler was maintained at about 10 inches from the top.

At the end of the test runs, the pre-cooler was removed from service and inspected after first raising the cooling water temperature to above the freezing point of the phthalic anhydride. The cooler was found to be clean and free from tar. Table III is a summary of the results obtained.

TABLE III

*Summary of data and results*

| Percentage of total phthalic anhydride produced as liquid | Average pre-cooler outlet temp., °C. | Air naphth. ratio | Cooler steam pressure, lb. per sq. in. gage | Steam temperature, °C. | Inlet gas temp., °C. | Duration of test, hours |
|---|---|---|---|---|---|---|
| 0 | 154.2 | 27.0-1 | 47 | 146.0 | 413 | 24 |
| 8.2 | 151.0 | 27.3-1 | 38 | 140.5 | 413 | 7 |
| 11.6 | 147.0 | 27.7-1 | 33 | 137.5 | 412 | 25 |
| 16.0 | 150.0 | 27.6-1 | 29 | 134.0 | 416 | 21 |
| 16.8 | 149.0 | 28.8-1 | 27 | 132.5 | 420 | 34 |
| 26.3 | 147.0 | 27.0-1 | 26 | 131.0 | 418 | 8 |
| 31.6 | 143.5 | 27.2-1 | 20.5 | 126.0 | 418 | 24 |
| 38.6 | 139.0 | 27.4-1 | 12 | 117.5 | 418 | 24 |
| 31.5 | 135.0 | 27.9-1 | 9 | 113.0 | 420 | 4 |

It was found that, when less than 16% of the total phthalic anhydride was condensed in the pre-cooler and recovered in the liquid form, the tarry substances and other impurities condensed, tended to adhere to the tubes of the pre-cooler requiring frequent cleaning of the tubes. As the amount of the phthalic anhydride condensed was increased, less tarry materials and the like adhered to the tubes and, when over 20% of the total phthalic anhydride was condensed in the pre-cooler in liquid form, only small amounts of tarry substances and other impurities adhered to the tubes of the pre-cooler and cleaning of the tubes was unnecessary over relatively long periods of time. When the amount of phthalic anhydride condensed was 26% to 40% of the total phthalic anhydride in the gaseous mixture, the walls of the tube were maintained clean and free from tar and did not require cleaning. By careful control of the pre-cooler, it may be practical to condense as much as 50% of the total phthalic anhydride in the gas as a liquid. Larger proportions may be so condensed but this will not usually be practical.

It should be recognized that the gases pass through the pre-cooler at a rapid rate. Under these conditions, usually only a part of the entire volume of gas contacts with the walls of the pre-cooler and is cooled to a sufficiently low temperature for condensation of phthalic anhydride. Some of the gases leaving the pre-cooler will be at a temperature below the dew-point and some will be at a temperature above the dew-point. This accounts in part for the fact that not all of the phthalic anhydride theoretically possible of condensation was condensed from the gases in the above experiments even where the average temperature of the gases leaving the pre-cooler was below the dew-point and why some phthalic anhydride was condensed when the average temperature of the gases leaving the pre-cooler was above the dew-point. Accordingly, when we use the phrase "cooling of the gaseous mixture to a temperature below the dew-point" or its equivalent herein or in the claims, it will be understood that we do not mean that all of the gaseous mixture must be so cooled but only that a sufficient proportion of the gaseous mixture must be so cooled that a film of the phthalic anhydride is condensed and maintained on the walls of the pre-cooler as a liquid until it leaves the pre-cooler.

This invention is not restricted to the particular structure of the individual pieces of apparatus shown as similar apparatus of different structure is well known and those skilled in the art can readily adapt such other apparatus to replace that shown. The gaseous mixture may be permitted to pass into the catch tank with the liquid products and out of the catch tank by a separate conduit (not shown) to the throttling valve. In this case, the gaseous mixture may be caused to bubble through the liquid in the catch tank to give more efficient cooling and to sublime some of the phthalic anhydride in the tank. Instead of using the steam, generated in the pre-cooler, for pre-heating the air or the naphthalene, it may be used for heating in other operations or may be merely condensed in any desired type of condenser or even be allowed to escape to the atmosphere. Where fluids, which depend on circulation for cooling and do not volatilize at the cooling temperature, are employed, their temperature and rate of circulation must be so controlled that the gaseous mixture leaving the pre-cooler will be at the desired temperature.

While we have disclosed our invention as applied to the manufacture of phthalic anhydride by the partial oxidation of naphthalene, it will be readily apparent that it is of general applicability in the preparation of phthalic anhydride by the partial oxidation of other polynuclear aromatic compounds, which yield phthalic anhydride, it merely being necessary to employ pressures and a ratio of air to the compound to be oxidized so that the dew-point of the reaction gases will be sufficiently above the melting point of the phthalic anhydride so that it may be condensed in liquid form. It is then only necessary to control the temperature of the cooling liquid so that part of the phthalic anhydride is condensed and maintained as a liquid in the pre-cooler.

One of the most important discoveries of our invention is that the cooling liquid can be at a temperature substantially lower than the freezing point of the phthalic anhydride without causing condensation of the phthalic anhydride or tarry substances on the walls of the pre-cooler in solid form. A further important discovery was that by condensing relatively large proportions of the phthalic anhydride, the adherence of carbon, tarry substances and other impurities to the walls of the pre-cooler could be prevented. The tarry substances contain finely divided carbon which, as is well known, tends to deposit upon and adhere to metallic surfaces.

Other advantages of our invention are that the apparatus occupies smaller floor space and requires a smaller number of condensing bins than was usually required in prior processes, thereby effecting large savings. Further, particularly when water or a similar volatilizable cooling liquid is used, it is possible to maintain much closer temperature control, as, when all conditions are constant, a variation of 1 to 3° C. is the most to be encountered. As a result, over-cooling, which was formerly existent, has been eliminated. There is less danger of solids crystallizing out and plugging the tubes of the pre-cooler. The phthalic anhydride recovered in the liquid form is much easier to handle and does not need remelting or grinding before further purification. This also results in large savings. The recovery of the liquid from the continuously moving gas keeps the tubes of the pre-cooler clean and free from carbon, tar and similar compounds, thereby greatly decreasing the frequent necessity of interrupting operations for cleaning the pre-cooler, thus effecting further large savings in the cost of manufacture. Since the tar and like impurities are condensed as liquids in the pre-cooler, the product collected in the bins is purer and the bins require less cleaning, with resultant savings in cost. Also, where water is employed in the cooler, the heat from the gases is converted to steam which may be used elsewhere in the system and for other purposes, or may be condensed and returned to the pre-cooler at the desired temperature thereby effecting economies in heat.

While we have disclosed the preferred embodiments of our invention, the preferred modes of carrying the same into effect and the advantageous results to be obtained thereby, it will be readily apparent to those skilled in the art that many variations and modifications may be made therein without departing from the spirit of my invention. Accordingly, the scope of our invention is to be limited solely by the appended claims construed as broadly as is permissible in view of the prior art.

We claim:

1. In the preparation of phthalic anhydride by partial oxidation of a polynuclear aromatic compound in vapor phase wherein a ratio of about 1 part of said compound to 23 to 35 parts of an oxygen-containing gas is employed and a hot, gaseous mixture containing phthalic anhydride vapors is formed, the improvement which comprises cooling the hot gaseous mixture to a temperature below the dew-point but above the melting point of the phthalic anhydride, while maintaining the gaseous mixture at a pressure sufficient to raise the dew-point of the phthalic anhydride in the mixture above 131° C., so as to condense phthalic anhydride in liquid form, passing the gaseous mixture and liquid phthalic anhydride into a catch tank where the liquid phthalic anhydride is collected and bubbling the gaseous mixture through the liquid phthalic anhydride in the catch tank.

2. In the preparation of phthalic anhydride by partial oxidation of naphthalene in vapor phase wherein a ratio of about 1 part of said compound to 23 to 35 parts of an oxygen-containing gas is employed and a hot, gaseous mixture containing phthalic anhydride vapors is formed, the improvement which comprises cooling the hot gaseous mixture to a temperature below the dew-point but above the melting point of the phthalic anhydride, while maintaining the gaseous mixture at a pressure sufficient to raise the dew-point of the phthalic anhydride in the mixture above 131° C., so as to condense phthalic anhydride in liquid form, passing the gaseous mixture and liquid phthalic anhydride into a catch tank where the liquid phthalic anhydride is collected and bubbling the gaseous mixture through the liquid phthalic anhydride in the catch tank.

WILLIAM ALEXANDER DOUGLASS.
HAROLD LA BELLE JONES.